(12) United States Patent
Yu et al.

(10) Patent No.: US 8,687,253 B2
(45) Date of Patent: Apr. 1, 2014

(54) SPECKLE NOISE REDUCTION BASED ON LONGITUDINAL SHIFT OF SAMPLE

(75) Inventors: Chung-Chieh Yu, Tucson, AZ (US); Isao Matsubara, Tucson, AZ (US); Mamoru Miyawaki, Tucson, AZ (US)

(73) Assignee: Canon Kabushiki Kaisha, Tokyo (JP)

(*) Notice: Subject to any disclaimer, the term of this patent is extended or adjusted under 35 U.S.C. 154(b) by 10 days.

(21) Appl. No.: 13/324,845

(22) Filed: Dec. 13, 2011

(65) Prior Publication Data

US 2013/0148182 A1 Jun. 13, 2013

(51) Int. Cl.
*G03H 1/26* (2006.01)
(52) U.S. Cl.
USPC .................................. 359/22; 359/32; 359/35
(58) Field of Classification Search
USPC ........................... 359/1, 9, 11, 22, 23, 24, 32
See application file for complete search history.

(56) References Cited

U.S. PATENT DOCUMENTS

| 5,299,035 | A * | 3/1994 | Leith et al. ........................ 359/9 |
| 7,127,109 | B1 * | 10/2006 | Kim ............................. 382/210 |
| 2008/0018966 | A1 * | 1/2008 | Dubois et al. ..................... 359/9 |
| 2009/0040527 | A1 * | 2/2009 | Popescu et al. ................. 356/491 |
| 2009/0284748 | A1 * | 11/2009 | Melman et al. ................. 356/479 |
| 2012/0162733 | A1 * | 6/2012 | Ferraro et al. .................... 359/9 |

FOREIGN PATENT DOCUMENTS

WO 2010096634 A1 8/2010

OTHER PUBLICATIONS

Shuhai et al. ("Speckle average technique for DSPI static deformation measurement", Proc. SPIE vol. 5663, pp. 646-650, Feb. 2005).*
Lopes et al. ("Adaptive Speckle Filters and Scene Heterogeneity", IEEE Transactions on Geoscience and Remote Sensing, vol. 28, No. 6, pp. 992-1000, Nov. 1990).*
Zhenghao et al., ("A comparison of digital speckle filters," Geoscience and Remote Sensing Symposium, 1994. IGARSS '94. Surface and Atmospheric Remote Sensing: Technologies, Data Analysis and Interpretation., International , vol. 4, No., pp. 2129,2133 vol. 4, Aug. 8-12, 1994).*
Golan et al. ("Speckle elimination using shift-averaging in high-rate holographic projection," Opt. Express 17, 1330-1339, Feb. 2009).*
Gross et al., "Noise and Aliases in Off-Axis and Phase-Shifting Holography" Applied Optics, Apr. 10, 2008, pp. 1757-1766, vol. 47, No. 11.
Pan et al., "Coherent Noise Reduction in Digital Holographic Phase Contrast Microscopy by Slightly Shifting Object" Optics Express, Feb. 28, 2011, pp. 3862-3869, vol. 19, No. 5.
Park et al., "Speckle-field Digital Holographic Microscopy" Optics Express, Jul. 20, 2009, pp. 12285-12292, vol. 17, No. 15.

* cited by examiner

*Primary Examiner* — Arnel C Lavarias
(74) *Attorney, Agent, or Firm* — Canon U.S.A., Inc. IP Division

(57) ABSTRACT

A method and apparatus for reducing speckle noise in an image of an object are disclosed. The method includes, placing the object in an interferometer at a first position along a beam path of an object beam, irradiating the object with the object beam, moving the object from the first position to a second position by longitudinally shifting the object along the beam path of the object beam, irradiating the object with the object beam at the second position. At each of the first and second positions a holographic image formed by interference between the object beam and a reference beam is recorded. An object image with reduced speckle noise is obtained by averaging the holographic images. Either an arithmetic mean or a weighted average may be used in the averaging of the holographic images.

12 Claims, 8 Drawing Sheets

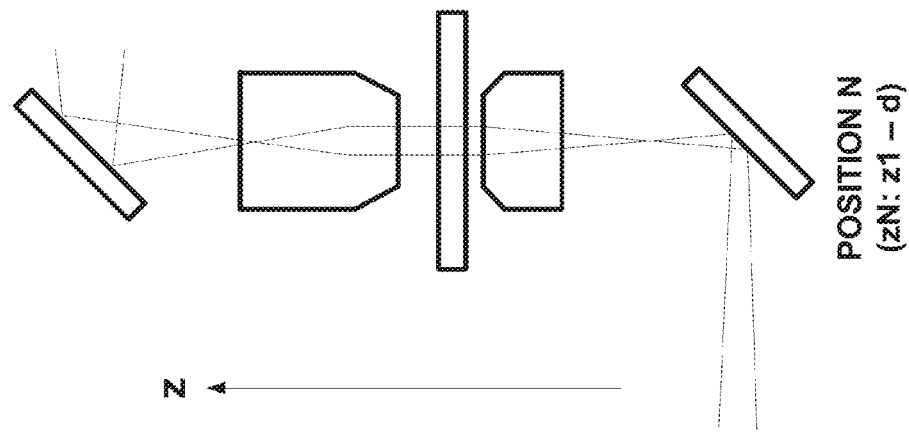
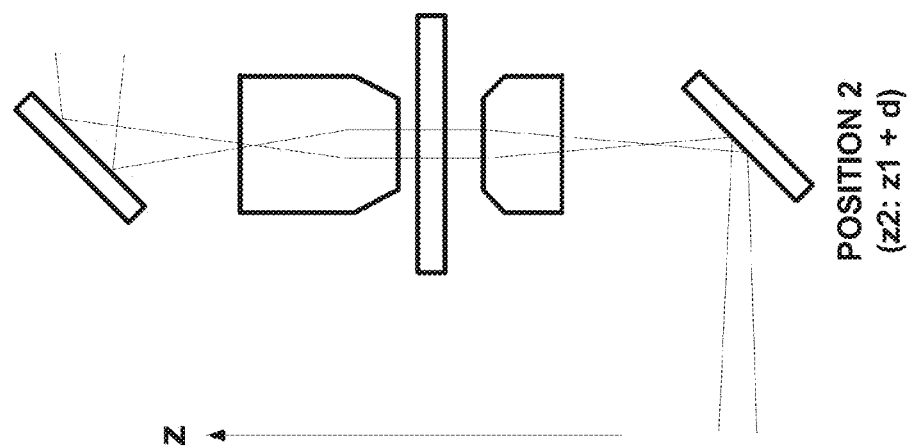
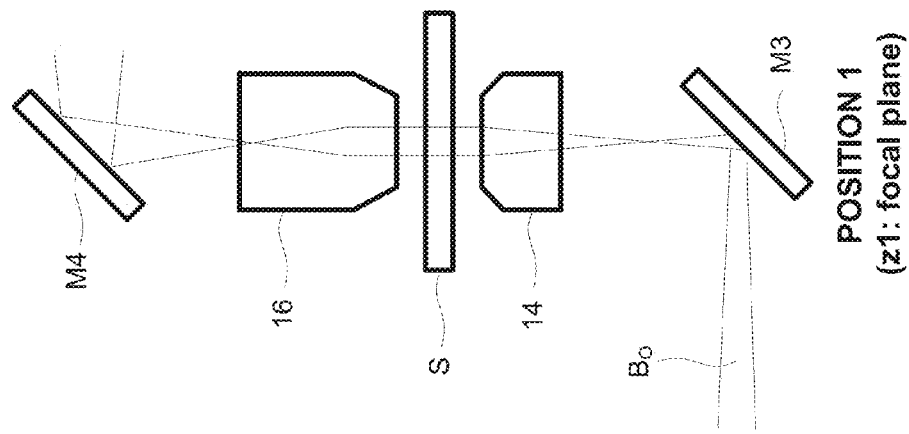

SPECKLE NOISE REDUCTION BASED ON LONGITUDINAL SHIFT OF SAMPLE

FIELD

The disclosure of the present application relates generally to optical interferometry and in particular to a method and an apparatus suitable for implementing speckle noise reduction for coherent illumination interferometry using longitudinal shifting of the sample.

BACKGROUND

Interferometric imaging, and more in particular holographic interferometry, offers a variety of applications. Holography is generally defined as the storage and reconstruction of wave fields by the recording of their interference pattern. Specifically, in holographic imaging, holograms are generally formed by recording the interference pattern of a coherent beam scattered by an object (object beam) and a coherent reference beam non-scattered by the object (reference beam). Holography with non-coherent light has also been demonstrated, but its use is less common. In conventional analog holography, holograms are recorded in photographic material, such as photographic film or plates, and the image of the object is usually reconstructed by illuminating the hologram with the same coherent reference beam. In digital holography, holograms are recorded by a detector array, such as a charge-coupled device (CCD) or a complementary metal-oxide semiconductor (CMOS) sensor, and the image of the object is reconstructed by a computer using numerical algorithms. The major advantage of digital holography is that it avoids the use of chemical photographic material, avoids photographic processing, and—with the latest advances in computing technology and processing techniques—holographic images can be recorded and reconstructed in substantially real time.

Off-axis holography is a commonly used digital holographic technique. In off-axis holography, the reference beam is angularly tilted with reference to object beam (the optical axis of the object beam incident on the object). Among other applications, off-axis holography has been used in precision measurements for determining particle size, polarization or coherence of light, phase-contrast, synthetic aperture, time-of-flight in optical coherence tomography (OCT), and for three-dimensional (3D) imaging. An important application of 3D imaging is the measurement of the shape of objects both in large and small scale. For example, holographic interferometry has been used to obtain 3D images of large objects, such as a car or a human body, or small objects, such as live cells or molecular particles within cells.

Another commonly used holographic technique is phase-shifting holography, where the reference beam is inline (or on-axis) with reference with the object beam. In general, 3 or 4 images are recorded with a phase difference of $2\pi/3$ or $\pi/2$, respectively, between each image. Recording a hologram inline requires a very accurate phase shift between consecutive images since the conjugate image alias overlaps with the true image. Thus, image aliases are suppressed by subtracting the conjugate image from the true image. Applications for phase-shifting holography are substantially similar to those for on-axis holography. Indeed, some applications that use a combination of off-axis and phase-shifting holography have been proposed. See, for example, "Noise and aliases in off-axis and phase-shifting holography" by Gross et al., Applied Optics, Vol. 47, No. 11, April 2008.

In holographic interferometry, in particular when using coherent illumination, an important aspect of research is focused on attempts to improve image quality by minimizing speckle noise. Specifically, because of the coherent illumination, the coherent noise or speckle (speckle noise), which originates from rough surfaces of the sample, refractive inhomogeneities of optics, multiple beam reflections, dust particles and the like, degrades the image quality and measurement accuracy. Numerous techniques have been previously proposed for mitigating speckle noise. Spatial or digital filtering methods, such as discrete Fourier filtering, Wiener filtering and wavelet filtering are well known. Filtering techniques may disadvantageously reduce image resolution. Other known methods include recording multiple holograms and superposing multiple reconstructed images with different speckle patterns. The multiple holograms may be obtained using different optical configurations including, for example, using multiple wavelengths, changing the incident angle of illumination, changing the polarization of illumination, using multi-angle tilted illumination, and others. Representative examples of techniques used to reduce speckle noise with their respective shortcomings are summarized below.

Yong-Keun Park et al., (hereinafter "Park"), in an article entitled "*Speckle-field digital holographic microscopy*", published by Optics Express 17 (15), 12285, July 2009, describes a technique of extracting a sample-induced phase delay with speckle illumination. Specifically, Park generated a speckle field by illuminating a holographic diffuser with a laser. The speckle field traveled through a microscope and was imaged on a detector. The hologram of the speckle field was generated by imposing a plane-wave reference beam on the detector. Using a heterodyne Mach-Zehnder interferometer, a complex E-field of the speckle was retrieved. Then, a sample (a polystyrene bead of 10 µm diameter) submerged in immersion oil was placed on a sample stage of the interferometer with the same speckle field illumination. Introducing the sample into the interferometer modified the original speckle pattern. Next, the E-field of the modified speckle was recorded in the same way as the recording of the original speckle pattern. In the obtained images, the sample is almost invisible because its image is overlapped with the complex pattern of the speckle field. It should be noted that with this technique the speckle is stationary, as the coherence length of the laser is much larger than the scattering length of the diffuser. Therefore, the background speckle field can be removed and the sample-induced complex field image can be retrieved from the speckle field by dividing it by the field without the sample. Purportedly, this technique can produce clear images of the sample.

However, since Park's disclosed technique relies on the premise that the background (phase image taken without the sample) can be successfully subtracted from the signal (phase image taken with the sample), this technique is not easily applicable for complicated samples larger than a single bead or a single cell. The reason for the difficulty is that inserting the sample is likely to change the speckle seen by the detector which makes the background subtraction very challenging if not impossible. In addition, since Park's disclosed technique is applied in the phase shifting configuration, it is very impractical in the off-axis configuration which requires spatial coherence. The off-axis configuration is highly desirable for high-speed tomographic phase imaging, for example. Therefore, although Park's technique is in principle feasible, it appears to be not practical for commercial applications, such as for high-speed tomographic phase imaging.

Feng Pan et al., (hereinafter "Pan"), in an article entitled "*Coherent Noise Reduction In Digital Holographic Phase Contrast Microscopy by Slightly Shifting Object*", published by Optics Express 19 (5), 3862, February 2011, discloses a method to reduce coherent noise in digital holographic phase contrast microscopy. According to Pan, by slightly shifting the sample in a lateral direction, a series of digital holograms with different coherent noise patterns is recorded. Each hologram is reconstructed individually, while the different phase tilts of the reconstructed complex amplitudes due to the specimen shifts are corrected in the hologram plane by using a numerical parametric lens method. Afterwards, the lateral displacements of the phase maps from different holograms are compensated in the image plane by using a digital image registration method. Thus, all phase images have the same distribution, but uncorrelated coherent noise patterns. By a proper averaging procedure, the coherent noise of phase contrast image is reduced significantly.

In the method disclosed by Pan, the reduction of the speckle noise is achieved by averaging the phase images taken at different lateral positions. Specifically, if positions are far apart so that the speckle patterns are decorrelated, the averaged image will tend to reveal the signal while the speckle noise is suppressed. The problem with Pan's proposed method is that in order to make sure that the speckle patterns are decorrelated, the amount of each lateral shift of the sample needs to be larger than several microns ($\mu m$). Specifically, according to Pan's published results, approximately 5 $\mu m$ per shift is necessary to reduce the correlation coefficient to less than 0.07. Therefore, for an average of 25 images (5×5), a shift of at least 20 $\mu m$×20 $\mu m$ is required. This will significantly reduce the field of view (FOV), in particular in microscopy where the FOV can be as little as 100 $\mu m$. In addition, the aberration, which can be in the form of phase gradient either linearly or spherically depending on the lateral position, is likely to be different for each image taken at the different lateral positions. This makes the aberration correction for each image difficult to be consistent.

International publication WO 2010/096634, published under the Patent Corporation Treaty (PCT) and disclosed by Robert F. Dillon et al. (hereinafter "Dillon"), discloses a technique entitled "*Speckle Noise Reduction for a Coherent Illumination Imaging System*". Dillon's method includes illuminating an object with coherent radiation at a plurality of angular orientations, acquiring an image of the illuminated object at each of the angular orientations, and summing the images of the illuminated object at each of the plural angular orientations to generate an image of the illuminated object having reduced speckle noise. However, it is seen that Dillon's method is namely directed to removing the speckle noise from intensity imaging, and may be inappropriate for phase imaging.

What is needed, therefore, is a technique that can overcome the above-noted shortcomings and reliably and accurately reduce speckle noise in a simple and efficient manner for both phase and amplitude (intensity) images.

SUMMARY

In accordance with at least one disclosed example, the instant disclosure provides a simple and yet highly accurate method and apparatus suitable for implementing speckle noise reduction for coherent illumination interferometry using longitudinal shifting.

According to one aspect of the present invention, a method for implementing speckle noise reduction for coherent illumination interferometry using longitudinal shifting includes: placing the object at a first position and irradiating the object with an object beam; recording a first holographic image formed by interference between the object beam irradiating the object at the first position and a reference beam not irradiating the object; moving the object from the first position to a second position different than the first position and irradiating the object with the object beam; recording a second holographic image formed by interference between the object beam irradiating the object at the second position and the reference beam not irradiating the object; and generating an object image by averaging the first holographic image with the second holographic image. Moving the object from the first position to the second position includes longitudinally shifting the object along a beam path of the object beam.

According to another aspect of the present invention, an apparatus for implementing speckle noise reduction for coherent illumination interferometry using longitudinal shifting includes: a radiation source configured to generate a radiation beam; an interferometer configured to divide the radiation beam into an object beam and a reference beam; a movable holder configured to move the object to a plurality of longitudinal positions along a beam path of the object beam by longitudinally shifting a position of the object along the beam path of the object beam; a radiation detector configured to detect a plurality of holograms formed by interference between the object beam modulated by the object and the reference beam not modulated by the object, each hologram being formed at a corresponding one of the plurality of longitudinal positions; a computer having a processor and configured to store the plurality of holograms in correspondence to the plurality of longitudinal positions at which the holograms have been detected, wherein the processor is configured to reconstruct a plurality of E-field images from the plurality of stored holograms, and to generate an output image by averaging the plurality of reconstructed E-field images.

Advantageously, it has been experimentally demonstrated that as the number of averaged images increases, the speckle noise in the object image decreases correspondingly. On the other hand, when a weighted average is used, by assigning a higher weight to an optically focused image rather than a numerically focused image, the speckle noise in the object image can be decreased with or without increasing the number of averaged images. Furthermore, by assigning different weights to numerically focused images taken at different amounts of optical defocusing, the speckle noise in the object image can be decreased with or without increasing the number of averaged images.

Other modifications and/or advantages of present invention will become readily apparent to those skilled in the art from the following detailed description in reference to the attached drawings.

BRIEF DESCRIPTION OF THE DRAWINGS

FIGS. 2A through 2C illustrate an overview of the general concept of obtaining holographic images by longitudinally shifting the sample, in accordance with the present invention;

DETAILED DESCRIPTION

Figure 1:
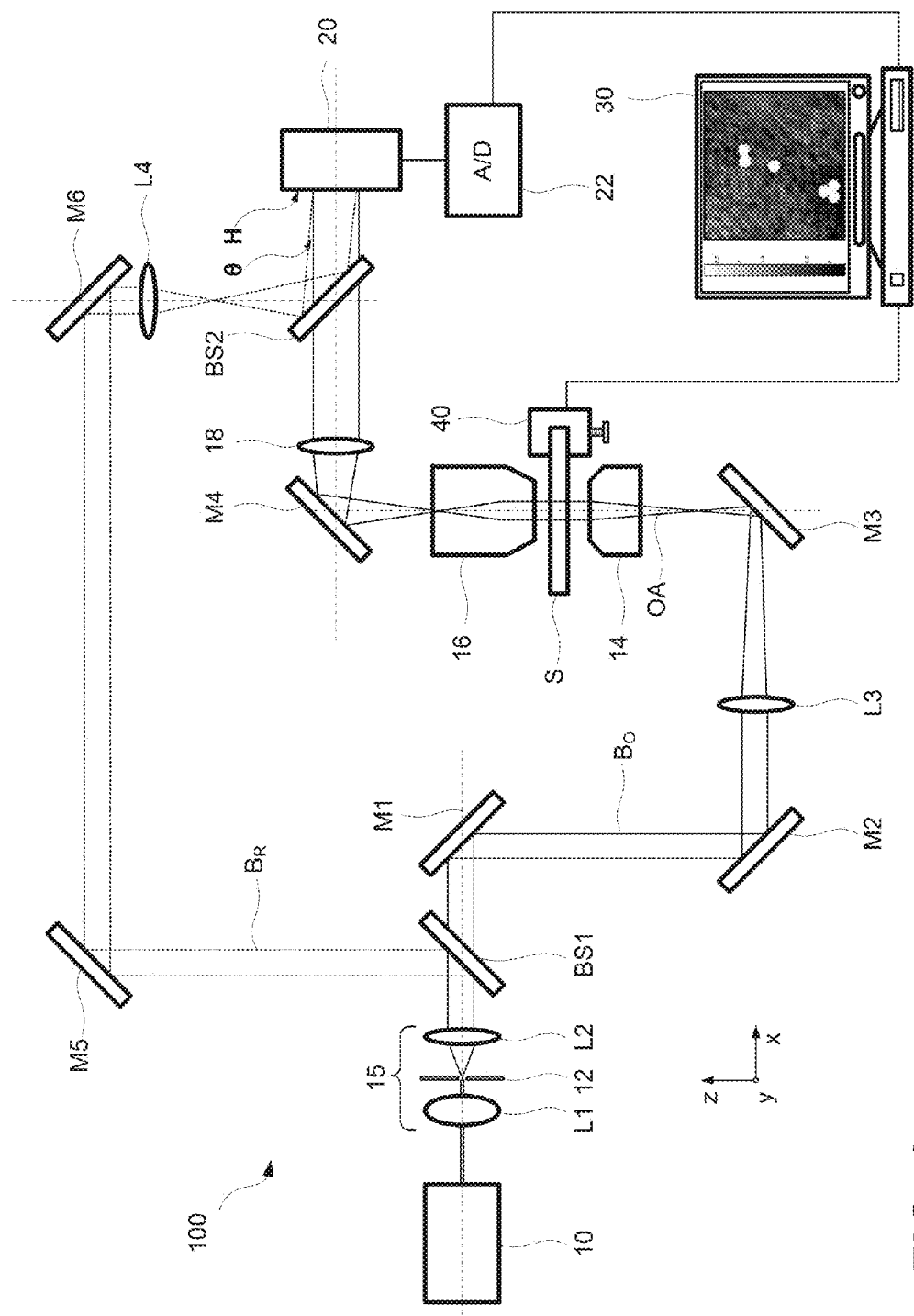
FIG. 1 is a diagram that illustrates an arrangement of an optical apparatus for obtaining holographic images of a sample, and for performing speckle noise reduction on the image of the sample, according to a first embodiment of the present invention.

In the following description, reference is made to the accompanying drawings which are illustrations of embodiments in which the disclosed methods and apparatus may be practiced. It is to be understood, however, that those skilled in the art may develop other structural and functional modifications without departing from the novelty and scope of the instant disclosure.

In referring to the description, specific details are set forth in order to provide a thorough understanding of the examples disclosed. In other instances, well-known methods, procedures, components and circuits have not been described in detail as not to unnecessarily lengthen the present disclosure. Some embodiments of the present invention may be practiced on a computer system that includes, in general, one or a plurality of processors for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse or pointing device) for communicating user input information and command selections to the processor.

As will be appreciated by those skilled in the art, at least part of the present examples may be embodied as a system, method or tangible (non-transitory) computer-readable medium storing a program product. Accordingly, some examples may take the form of an entirely hardware embodiment, and entirely software embodiment (including firmware, resident software, micro-code, etc.) or an embodiment combining software and hardware aspects that may all generally be referred herein as a "circuit", "module" or "system". Further, some embodiments may take the form of a computer program product embodied in any tangible medium having computer-readable program code stored therein. For example, some embodiments or processes described below with reference to flowchart illustrations and/or block diagrams of methods, apparatus (systems) and computer program products can be implemented by computer program instructions. The computer program instructions may be stored in computer-readable media that when read by a computer can direct the computer or other programmable device to function in a particular manner to implement the function/act/step specified in the flowchart and/or block diagram.

As used herein, all terms should be accorded the ordinary and customary meaning in the light and context of the specification, as understood by persons of ordinary skill in the art to which the present application pertains. Certain terms may be accorded a more specific meaning in the specific context of the present application. For example, the term "radiation" as used herein may preferably refer to electromagnetic radiation including the visible, near-infrared (NIR), infrared (IR), and ultraviolet (UV) ranges. In addition, radiation may also refer to cosmic or high-energy particle radiation. That is, as used herein, radiation may also include $\alpha$ rays, $\beta$ rays, $\gamma$ rays emitted by radiation decay, X-rays, particle beams, cosmic rays, and others. The terms "average" or "averaging" may, at some times, be interchangeably used and are meant to indicate a result obtained by adding several quantities together and then dividing the total result by the number of quantities. Thus, the terms average or averaging are meant to describe the mathematical concept also referred to as the "mean" of several quantities put together. However, as it is known to persons having ordinary skill in the art, the mathematical concepts of overage or averaging is not limited to the arithmetic "mean". Indeed, as used herein, the average may be preferably obtained by using a weighted average resulting from the multiplication of each component by a factor reflecting its importance. Referring now to the drawings, where like reference numerals refer to like parts, exemplary embodiments of the invention are described.

FIG. 1 is a diagram that illustrates an arrangement of an optical apparatus 100 for obtaining holographic images of a sample S (object), and for performing speckle noise reduction on the image of the sample, according to an embodiment of the present invention. As illustrated in FIG. 1, apparatus 100 includes a radiation source 10, an interferometer, a radiation detector 20, and a computer 30 (processor). The radiation source 10 may be implemented, for example, by a known radiation source, such as laser device which may generate a coherent radiation beam at a desired wavelength. In alternate embodiments, the radiation source 10 may also be implemented by a non-coherent radiation source, such as a mercury or tungsten lamp. In further embodiments, the radiation source 10 may be implemented by a high-energy radiation source, such as an x-ray source, or the like. In a practical example, the inventors herein have used a Helium-Neon laser emitting a coherent radiation beam with a wavelength of 543 nanometers (nm). The radiation beam emitted from the light source 10 passes through a spatial filter 15, which consists of a first lens L1, a pinhole 12 and a second lens L2. The radiation beam is collimated and size-controlled by the spatial filter 15, and then it is split by a beam splitter BS1 into an object beam $B_O$ (object beam) and a reference beam $B_R$ (reference beam). Accordingly, both the object beam $B_O$ and the reference beam $B_R$ are preferably generated with the same parameters, such as phase, amplitude, wavelength, etc. More preferably, each of the object beam $B_O$ and the reference beam $B_R$ may be controlled with additional optics to have appropriate intensity, polarization, etc. to generate appropriate interference patterns at an image plane H.

One arm of the interferometer includes an object beam path, and the other arm of the interferometer includes a reference beam path. The object beam path extends from the beam splitter BS1 to an image plane H (hologram plane), and includes a first Mirror M1, a second minor M2, a third lens L3, a third minor M3, lens condenser 14, an objective lens 16, a fourth minor M4, a tube lens 18, and a second beam splitter BS2. Along the object beam path, the object beam $B_O$ is collimated and its diameter size is controlled by a 4-f lens relay system. The 4-f lens relay system includes the third lens L3 and the condenser lens 14; the third lens L3 is disposed between the second minor M2 and the third mirror M3, but may be also located elsewhere along the object beam path. With the appropriate beam size and collimation, the object beam $B_O$ travels through the sample S (object). As the object beam $B_O$ travels through the sample S, the object beam $B_O$ interacts with the sample so that the sample modulates the wavefront of the object beam $B_O$ and a sample-modulated signal (sample image) is formed therein. The sample-modulated signal is subsequently magnified and projected onto the radiation detector 20 via the objective lens 16 and the tube lens 18. The radiation detector 20, in the present embodiment, may be implemented by any one of a charge-coupled-device (CCD) sensor, a complementary metal oxide semiconductor (CMOS) sensor, a holographic film plate (e.g., silver halide film), or the like. In alternate embodiments, the interferometer or at least a part thereof may be implemented by the optics of a conventional digital holographic microscope. In this case, at least the condenser lens 14 and the objective lens 16, in the object beam path, are optical elements provided within the digital holographic microscope.

The reference beam path extends from the beam splitter BS1 to an image plane H, and includes a fifth mirror M5, a sixth minor M6, a fourth lens L4, and the beam splitter BS2. Thus, the reference beam $B_R$ freely travels unobstructed along the reference beam path from the beam splitter BS1 to the image plane H. In other words, the reference beam $B_R$ does not interact with the sample, but travels from beam splitter BS1 to beam splitter BS2 unobstructed to be projected thenceforth onto the radiation detector 20. The size and the wavefront shape (curvature) of the reference beam $B_R$ are controlled by the fourth lens L4 to match the size and the wavefront shape (curvature) of the object beam $B_O$ at the image plane H of the radiation detector 20. More specifically, after the reference beam $B_R$ is guided towards the radiation detector 20 by the beam splitter BS2, the reference beam $B_R$ and the object beam $B_O$ are overlapped at the image plane H. In order to ensure an off-axis configuration, the reference beam $B_R$ is controlled to be incident on the image plane H at a controlled angle $\theta$. The angular tilt, represented by angle $\theta$ in FIG. 1, between the object beam $B_O$ and the reference beam $B_R$ can be precisely adjusted, for example, by tilting the beam splitter BS2 in front of the radiation detector 20. In alternate embodiments, the object beam $B_O$ and the reference beam $B_R$ can overlap so that no angle is formed therebetween. In this case, it is considered that the object beam $B_O$ and the reference beam $B_R$ can form an interference pattern an in-line manner in the phase-shifting configuration.

At the image plane H, a combined beam, which results by overlapping the reference beam $B_R$ and the object beam $B_O$ at a predetermined angle $\theta$ therebetween, produces an interference pattern that is detected by the sensor of the radiation detector 20. Specifically, the combined beam resulting of the interference between the object beam $B_O$ and the reference beam $B_R$ gives rise to interference fringes when the sample is not present. However, when the sample is present, the sample gives rise to interference fringes which will be modulated by the object beam phase change induced by the presence of the sample. The modulated interference fringes, which include information on the wavefront phase change and information on amplitude variations (intensity) of the object beam, are acquired by the radiation detector 20 as images of an interference pattern for at least three spatial phases of the pattern. The detected images are digitized by an analog-to-digital converter 22 (or similar known hardware), and the digitized data representing the detected images are transferred to the computer 30, such as a specifically programmed general purpose computer, a distributed computing network, or the like. Data representing the detected images is then numerically processed by known image processing techniques to extract and output (e.g., display or print) the desired information included in the detected images. In the context of the present application, the representative computer 30 may include at least a central processing unit, such as processor or microprocessor; one or more data storage units; inputting devices, such as a keyboard, mouse, a touch screen, or the like; and one or more output devices, such as a display device, a printing device, or the like.

Turning now to the specific challenges of processing the detected images and extracting the desired information, it should be noted that, since the object beam $B_O$ and the reference beam $B_R$ both include coherent or substantially coherent radiation, the information contained in the detected images is often obscured by the presence of speckle noise. Thus, one aspect of the present invention is directed to a technique that efficiently reduces the speckle noise in the detected images.

As discussed in the Background section of the present specification, supra, one conventional method of reducing speckle noise includes averaging phase images taken at different lateral positions. However, in order to make sure the speckle patterns are decorrelated, each lateral shift amount needs to be larger than several microns, and numerous images must be averaged to obtain a good result. Lateral shift, therefore, is disadvantageous because this will significantly reduce the field of view (FOV) in microscopy whose FOV can be as little as 100 µm. For example, for an average of 25 images (5×5), with a shift step of 5 µm, a total shift of 20 µm×20 µm is necessary. This means that a substantial area of the FOV is unused due to overlap caused by the lateral shift. In addition, it is known that in conventional bright field microscopy, where only a small area of the sample is examined at a time by observing or recoding light intensity, lateral shifting is generally used, so that each area being imaged is placed in focus. Thus, in traditional bright field microscopy, longitudinally shifting the sample may result in the sample being out of focus so longitudinal shifting is not desirable.

In contrast, embodiments of the present invention disclose a novel configuration for reducing the speckle noise for coherent illumination interferometry using longitudinal shifting. Compared to conventional methods, the technique disclosed herein has at least the following advantages: (1) it does not rely on stringent image registration for background subtraction; and (2) it can be implemented in the off-axis configuration as well as the phase-shifting configuration; (3) it will not reduce the available FOV as in lateral shifting; and (4) it will have small aberration difference between different holograms because all holograms are taken with the sample in place and only a minor longitudinal shift, which causes essentially not change in the FOV or optical parameter. Although the longitudinal shift may cause minor optical defocusing, the phase and amplitude information contained in each hologram can be reliably used to numerically focus the sample at each position.

Turning now to FIGS. 2A, 2B and 2C, an overview of the general concept of obtaining holographic images by longitudinally shifting the sample will be explained. In FIG. 2A, for purposes of clarity, only parts relevant to the concept of longitudinal shifting of the sample S are illustrated. Reference numerals already described in FIG. 1 are not described again. Moreover, for ease of illustration, FIGS. 2B and 2C have no reference numerals, but one of ordinary skill in the art will understand that like shaped elements refer to like reference numerals. The basic concept of reducing speckle noise by longitudinal shifting includes: (i) obtaining a series of N holograms, each obtained at a different longitudinal position; (ii) obtaining a series of N phase images and N amplitude images, by reconstructing a phase image and an amplitude image from each hologram taken at each different position; (iii) and obtaining a resultant image (output image), by averaging the N phase images and the N amplitude images respectively. Notably, reconstructing a phase image and an amplitude image from each hologram taken at each different position may include performing a numerical focus calculation to bring an out-of-focus image into focus. FIGS. 2A through 2C illustrate a first position (POSITION 1), a second position (POSITION 2), and an N position (POSITION N) representing the plurality of N positions at which a sample S may be placed.

More specifically, a first hologram $H_1$ is taken with the sample S positioned at a first longitudinal position $z_1$, as illustrated in FIG. 2A. The numerical focusing position can be set at $z_1$ to ensure that the sample S at the foal plane (that is, in focus) of the optical system, so that the reconstructed phase image PI_1 and amplitude image AI_1 are optically focused. After the hologram $H_1$ has been acquired, the sample S is moved in a direction parallel to the propagation of the object beam from position $z_1$ to a position $z_2$. In FIG. 1, the sample S is moved either in a positive (+z) or negative (−z) direction along an optical axis OA of the object beam as the object beam $B_O$ is transmitted (travels) through the sample S. To move the sample S, a conventionally known translation stage 40 connected to a step motor controlled by the computer 30, for example, can be provided. Once the sample S has been translated by a predetermined distance d, a second hologram $H_2$ is taken with the sample S positioned at the second longitudinal position $z_2$, as illustrated in FIG. 2B. In FIG. 2B, should be noted that the second longitudinal position $z_2$ is higher than the first longitudinal position $z_1$ to illustrate the shifting movement of sample S along the beam path of the object beam $B_O$. In other words, the second position $z_2$ is different that the first position $z_1$. When the numerical focusing position is still set at $z_1$, the phase and amplitude images, reconstructed from the second hologram $H_2$, will have the sample out of focus. However, when the numerical focusing position is set at position $z_2$, the sample will again be in focus on the reconstructed phase image PI_2 and amplitude image AI_2. Here, it should be noted that although the first set of images PI_1 and AI_1 and the second set of images PI_2 and AI_2 have the image of the sample in focus, these two sets of images do not include the same speckle noise pattern. Specifically, since speckle noise is position dependent, once the two sets of images are reconstructed from two holograms $H_1$ and $H_2$ taken at different longitudinal positions $z_1$ and $z_2$, the images can still be numerically focused, but the speckle noise is different and random in each set of images. Thus, by averaging the phase images and amplitude images, the speckle noise can be effectively reduced. Advantageously, as the number of holographic images taken at different longitudinal positions increases, speckle noise reduction correspondingly improves. Thus, the number of N holographic images taken at different longitudinal positions, and the corresponding reconstructed N phase and amplitude images may be increased as necessary.

Next, mathematical concepts related to holographic reconstructing and numerical focusing are discussed. Specifically, holograms are taken with the sample S at different z locations, e.g. z1 and z2. At each location, a hologram is formed at the holographic plane H, when the electric field $E_O$ arriving from the object beam $B_O$ having interacted with the sample S interferes with the electric field $E_R$ arriving from the reference beam $B_R$. Thus, the resulting intensity of the interference pattern can be expressed as: $|E_O+E_R|^2$. This intensity pattern is recorded by the detector 20 with the sample S at each z position. Accordingly, the holograms taken with the sample S at two different longitudinal positions z1 and z2 can be respectively expressed as equations (1) and (2) as follows:

$$|E_{O,z1}(x, y, z0) + E_R(x, y, z0)|^2 = |E_{O,z1}(x, y, z0)|^2 + |E_R(x, y, z0)|^2 + \qquad (1)$$
$$E_{O,z1}(x, y, z0)E_R^*(x, y, z0) + E_{O,z1}^*(x, y, z0)E_R(x, y, z0),$$

$$|E_{O,z2}(x, y, z0) + E_R(x, y, z0)|^2 = |E_{O,z2}(x, y, z0)|^2 + |E_R(x, y, z0)|^2 + \qquad (2)$$
$$E_{O,z2}(x, y, z0)E_R^*(x, y, z0) + E_{O,z2}^*(x, y, z0)E_R(x, y, z0),$$

where z0 is the position of the focal plane of the image system, $E_{O,z1}(x,y,z0)$ and $E_{O,z2}(x,y,z0)$ are the electric fields for the object beam with sample S located at longitudinal positions z1 and z2 respectively, and $E_R(x,y,z0)$ is the electric field for the reference beam.

In equations (1) and (2), the first and second terms correspond to the 0th order light, the third term corresponds to +1st order light (or a true image), and the fourth term corresponds to −1st order light (or a twin image). The third term can be re-written to obtain equations (3) and (4) as shown below. From equations (3) and (4), it can be appreciated that a phase itself cannot be directly measured because light propagates with very high speed, but it is possible to obtain a phase difference. Specifically, in the following equations shown below, $(\phi_{O,z1}(x,y,z0)-\phi_R)$ and $(\phi_{O,z2}(x,y,z0)-\phi_R)$ represent the phase differences in the third term of equations (1) and (2) between the object beam $B_O$ and the reference beam $B_R$ at the holographic plane H when a holographic image is recorded with the sample S at positions z1 and z2 respectively.

$$E_{O,z1}(x, y, z0)E_R^*(x, y, z0) = |E_{O,z1}(x, y, z0)|\exp[i\phi_{O,z1}(x, y, z0)] \cdot |E_R(x, y, z0)|\exp[-i\phi_R] \qquad (3)$$
$$= |E_{O,z1}(x, y, z0)| \cdot |E_R(x, y, z0)|\exp[i(\phi_{O,z1}(x, y, z0) - \phi_R)]$$
$$\propto |E_{O,z1}(x, y, z0)|\exp[i(\phi_{O,z1}(x, y, z0) - \phi_R)],$$

$$E_{O,z2}(x, y, z0)E_R^*(x, y, z0) = |E_{O,z2}(x, y, z0)|\exp[i\phi_{O,z2}(x, y, z0)] \cdot |E_R(x, y, z0)|\exp[-i\phi_R] \qquad (4)$$
$$= |E_{O,z2}(x, y, z0)| \cdot |E_R(x, y, z0)|\exp[i(\phi_{O,z2}(x, y, z0) - \phi_R)]$$
$$\propto |E_{O,z2}(x, y, z0)|\exp[i(\phi_{O,z2}(x, y, z0) - \phi_R)],$$

The +1st order light can be picked up by using an appropriately designed numerical aperture, and Fourier transform of the +1st order light corresponds to the equations above.

Thus, phase distribution can be reconstructed. $E_{O,z1}(x,y,z0)$ and $E_{O,z2}(x,y,z0)$ are two reconstructed E fields where $|E_{O,z1}(x,y,z0)|$ and $|E_{O,z2}(x,y,z0)|$ are the E-field amplitude images (AIs) and $(\phi_{O,z1}(x,y,z0)-\phi_R)$ and $(\phi_{O,z2}(x,y,z0)-\phi_R)$ are the E-field phase images (PIs).

These complex E fields are reconstructed from holograms acquired with the focal plane of the image system set at z0 and the sample S is longitudinally shifted to positions z1 and z2. When the sample S is out of focus (z1 and z2 are not on the focal plane of the image system), the reconstructed complex E field has the speckle pattern at z0 plane, but the sample image is out of focus. An in-focus sample image can be obtained by numerically focusing the out-of-focus sample image. Numerical focusing can be performed in accordance with equations (5) and (6) shown below:

$$V\left(\frac{\alpha}{\lambda},\frac{\beta}{\lambda},z1\right) = \int\int E_{O,z1}(x,y,z0)\exp\left[-i2\pi\left(\frac{\alpha}{\lambda}x+\frac{\beta}{\lambda}y\right)\right]dxdy \quad (5)$$

$$E'_{O,z1}(x,y,z0) =$$
$$\int\int V\left(\frac{\alpha}{\lambda},\frac{\beta}{\lambda},z1\right)\exp\left[i\frac{2\pi}{\lambda}\sqrt{1-\alpha^2-\beta^2}(z0-z1)\right]\mathrm{circ}\left(\sqrt{\alpha^2+\beta^2}\right)$$
$$\exp\left[i2\pi\left(\frac{\alpha}{\lambda}x+\frac{\beta}{\lambda}y\right)\right]d\frac{\alpha}{\lambda}d\frac{\beta}{\lambda},$$

$$V\left(\frac{\alpha}{\lambda},\frac{\beta}{\lambda},z2\right) = \int\int E_{O,z2}(x,y,z0)\exp\left[-i2\pi\left(\frac{\alpha}{\lambda}x+\frac{\beta}{\lambda}y\right)\right]dxdy \quad (6)$$

$$E'_{O,z2}(x,y,z0) =$$
$$\int\int V\left(\frac{\alpha}{\lambda},\frac{\beta}{\lambda},z2\right)\exp\left[i\frac{2\pi}{\lambda}\sqrt{1-\alpha^2-\beta^2}(z0-z2)\right]\mathrm{circ}\left(\sqrt{\alpha^2+\beta^2}\right)$$
$$\exp\left[i2\pi\left(\frac{\alpha}{\lambda}x+\frac{\beta}{\lambda}y\right)\right]d\frac{\alpha}{\lambda}d\frac{\beta}{\lambda},$$

where z0 is the position of the focal plane of the image system, $\lambda$ is the wavelength of the illumination used to generate the holographic images, and $\alpha$ and $\beta$ are the x and y coordinates in Fourier space. The first expression in equations (5) and (6) represents a Fourier transform of the object beam electric field with the sample S located at positions z1 and z2, respectively; and the second expression in equations (5) and (6) represents an inverse Fourier transform with a numerical focusing factor $\exp\left[i(2\pi/\lambda)\sqrt{1-\alpha^2-b^2}(z0-zj)\right]\mathrm{circ}(\sqrt{\alpha^2+\beta^2})$ where j=1 or 2, respectively. The second equation will be exactly an inverse Fourier transform if z0=zj except for the effect of an evanescent wave. The numerically focused complex E fields $E'_{O,z1}(x,y,z0)$ and $E''_{O,z2}(x,y,z0)$ have the speckle patterns at longitudinal positions z1 and z2, instead of the focal plane z0, whereas the sample S image is in focus.

By performing the numerical focusing equations (5) and (6), as shown above, one can ensure that each sample image is in focus even if the sample S is not located at the focal plane z0 of the optical system. In this manner, an E field average can be obtained by simply averaging the E fields reconstructed and numerically focused from holograms taken at positions z1 and z2, as follows:

$$E_{O,average}=(E'_{O,z1}(x,y,z0)+E_{O,z2}(x,y,z0))/2. \quad (7)$$

Accordingly, to generalize, the averaged E field using N holograms taken at longitudinal positions z1, z2, ..., zN (planes) can be calculated as an arithmetic mean, as shown in equation (8).

$$E_{O,average} = \left(\sum_{j=1\rightarrow N} E'_{O,zj}(x,y,z0)\right)/N. \quad (8)$$

Alternatively, and more preferably, the E-field average may be obtained by using a weighted average where the resulting E-field average is obtained by multiplying the E-field obtained at each z position by a factor representing its importance:

$$E_{O,average} = \left(\sum_{j=1\rightarrow N} w_j \cdot E'_{O,zj}(x,y,z0)\right)/N, \quad (9)$$

where $w_j$ denotes the weight assigned for j-th E field taken with the sample located at the longitudinal position zj. For example, the E-field obtained at an optically focused position (e.g., at z=0) may be given the highest weight, whereas the E-field obtained at a position furthest from the optically focused position may be given the lowest weight. Weighted average functions or algorithms are considered to be well known to persons having ordinary skill in the art, and any can be used, as long as higher weight is assigned to the E-field obtained at or closest to the optical focus.

Figure 3:
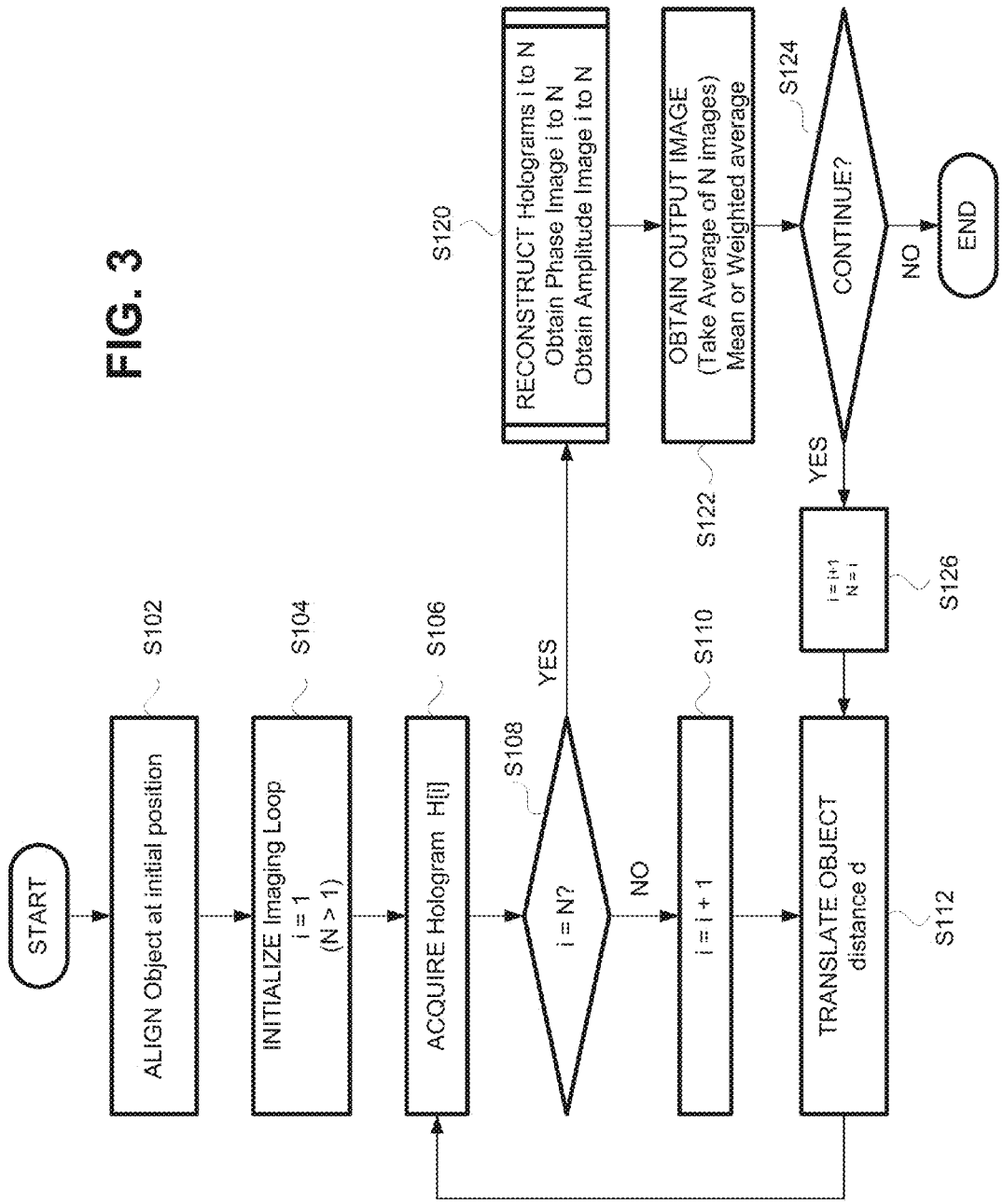
FIG. 3 illustrates a flowchart with an exemplary flow process for performing the method of reducing speckle noise in an image of an object by averaging a plurality of longitudinally shifted holographic images, in accordance with the present invention.

To best illustrate the mathematical concepts discussed above, an example of a method for reducing speckle noise in an image of an object is described, in accordance with the present invention. Specifically, FIG. 3 illustrates an exemplary flow process for performing the disclosed method using the apparatus illustrated in FIG. 1 and the longitudinal shift concept illustrated in FIG. 2. In FIG. 3, when one desires to examine a sample, at step S102, the sample is placed in the apparatus 100, for example, in the translation stage 40. As it would be understood by one of ordinary skill in the art, in order to initiate an imaging process, the sample should properly aligned with the object beam $B_O$, and optically focused on the image plane H. For example, when apparatus 100 or a part thereof is being used as a microscope, the sample may be laterally translated so at to place the sample or a region thereof in the field of view of the microscope. In addition, the sample S may also be longitudinally translated so that the sample is optically focused on the image plane H of radiation detector 20. The process of placing the sample in an appropriate position and ensuring that it is focused on the radiation detector 20 may be achieved manually or in an automated manner, for example, by controlling the stage 40 with the computer 30. Sample positioning and feedback controls are considered to be well known by one of ordinary skill in the art. Once the sample is properly aligned at the initial position, the flow process of FIG. 3 advances to step S104. In step S104, the computer 30 (see FIG. 1) is readied for initializing an imaging operation. Specifically, at step S104, parameters such as the number of images N to be acquired, and an index "i" can be initialized prior to initiating the imaging process. For example, a number of holograms may be established in advance and entered as a value for N. Specifically, since at least two holograms (each at a different longitudinal position) are required to obtain an average, the number of images N should at least be set to be greater than 1 (N>1). Similarly, in order to keep record of the number of images acquired the index i will be initialized to 1 (i=1) when the process of FIG. 3 starts. Incidentally, it should be noted that steps S102 and S104 do not represent a preferable order, and as such these steps can be performed interchangeably or simultaneously. Once the imaging loop has been initialized at step S104, the process advances to step S106.

In step S106, the radiation detector 20 acquires a first hologram $H_1$ with the sample located at a first position $z_i$. FIG. 2A illustrates an example of the sample S disposed at a first position $z_1$. The acquired hologram $H_1$ is digitized by the A/D converter 22 and then stored in a non-illustrated memory of the computer 30. At step S108, the computer 30 determines whether the number of holograms, indicated by the index i, is equal to the predetermined number of desired images N. Since the number of images N must be greater than one, in the first loop, the determination at step S108 is negative (NO), and the flow proceeds to step S110 where the index i is incremented by 1. Accordingly, a second imaging loop is started when the flow process advances to step S112.

At step S112, the computer 30 controls the translation stage 40 of apparatus 100 to translate the sample S in a longitudinal direction by a predetermined distance d. That is, at step S112, the sample S is moved a predetermined distance d from the first position z1 to a second position z2 different than the first position. Distance d may be any longitudinal distance greater than zero to obtain a longitudinal shift of the sample S. Specifically, as used herein, a longitudinal shift should be understood as a change in position in a direction parallel to the object beam $B_O$, as the object beam travels through the sample. Here, it should be noted that the distance d may be established, for example, in a trial and error manner so as to determine the minimum distance necessary to obtain maximum image resolution with minimum speckle noise. Alternatively, a table of predetermined distances d may be established before hand, for example, from previous experimental data. In the case that a table of predetermined distances d exists, the values of such a table may be stored in the non-illustrated memory of the computer 30, or may be manually entered by an operator of apparatus 100. Regardless of how distance d is established, after the sample S has been longitudinally shifted by the distance d, the flow process returns to step S106.

At step S106, the corresponding hologram H[i] (in this case a second hologram $H_2$) is detected by the radiation detector 20, digitized by the A/D converter 22, and stored in the computer 30, as described above. Here, it is noted that, at step S106, each hologram H[i] should be stored in conjunction with the position z[i] at which the sample S is located when the hologram is acquired. For example, when a hologram H1 is obtained with the sample at position z1, a hologram H2 is obtained with the sample at position z2, and a hologram $H_N$ is obtained at position zN, the data for each hologram may be recorded by the computer 30 in a tabulated manner, as shown in Table 1. As further discussed below the data of Table 1 can be used to reconstruct the holograms H [i to N] so as to obtain numerically focused phase and amplitude images of the sample S.

TABLE 1 exemplary tabulation of data recorded in a non-illustrated memory of computer 30 and used to reconstruct phase and amplitude images from N holograms.

| Hologram H[i] | Sample position z[i] | Longitudinal shift distance d (μm) |
|---|---|---|
| $H_1$ | $Z_1$ | 0 |
| $H_2$ | $Z_2$ | +3 |
| $H_3$ | $Z_3$ | −3 |
| $H_N$ | $z_N$ | — |

Returning now to step S108 of FIG. 3, when the computer 30 determines that the desired number of holograms N has been acquired (YES at S108), the process now proceeds to step S120. At the outset of the process a value of N=2, that is, a minimum of 2 holographic images may be used to perform an initial evaluation of the level of speckle noise reduction.

At step S120, each of the holograms i to N are reconstructed to obtain N phase images and N amplitude images, as further explained below in reference to FIG. 4. Once the phase and amplitude images have been obtained, the flow process advances to step S122. In step S122, a result image is obtained by averaging the obtained N images. As discussed above, in reference to equations (7) and (8), the arithmetic mean of the N images can be used. Preferably, however, a weighted average where higher weight is given to a predetermined image can be used. More preferably, the arithmetic mean of the N images can be first calculated and a resulting output image can be displayed for visual evaluation. Then, based on the observed or desired level of accuracy (speckle noise), it can be selected whether to acquire additional images or whether to use a weighted average. For example, at step S122, the result image can be displayed on a display device of the computer 30 or may be printed for evaluation. At step S124, based on the result image, an evaluation is made as to whether the result image is acceptable. For example, a visual analysis can be made to visually evaluate whether the result image meets the desired resolution and speckle noise reduction. Alternative, an automated analysis may be performed, for example, based on a signal-to-noise (S/N) threshold value to determine whether the speckle noise has been reduced to the desired level. When, at step S124, it is determined that the obtained result image meets the expected resolution, quality, speckle noise reduction or the like, the process is not continued (NO at S124) and it is ended.

On the other hand, when it is determined at step S124 that the obtained result image does not meet expectations, additional holograms may be obtained. Accordingly, the flow process continues (YES at S124). Specifically, the process advances to step S126 where the index i is increased by 1 and the number of holograms N is made equal to i. Subsequently, the process advances to step S112 where the sample is again longitudinally shifted and a new hologram is acquired as already described above. The process may continue until at step S124 it is determined to end the process. In this manner any number of holograms can be used to obtain a resulting image with reduced speckle noise and improved resolution.

Figure 4:
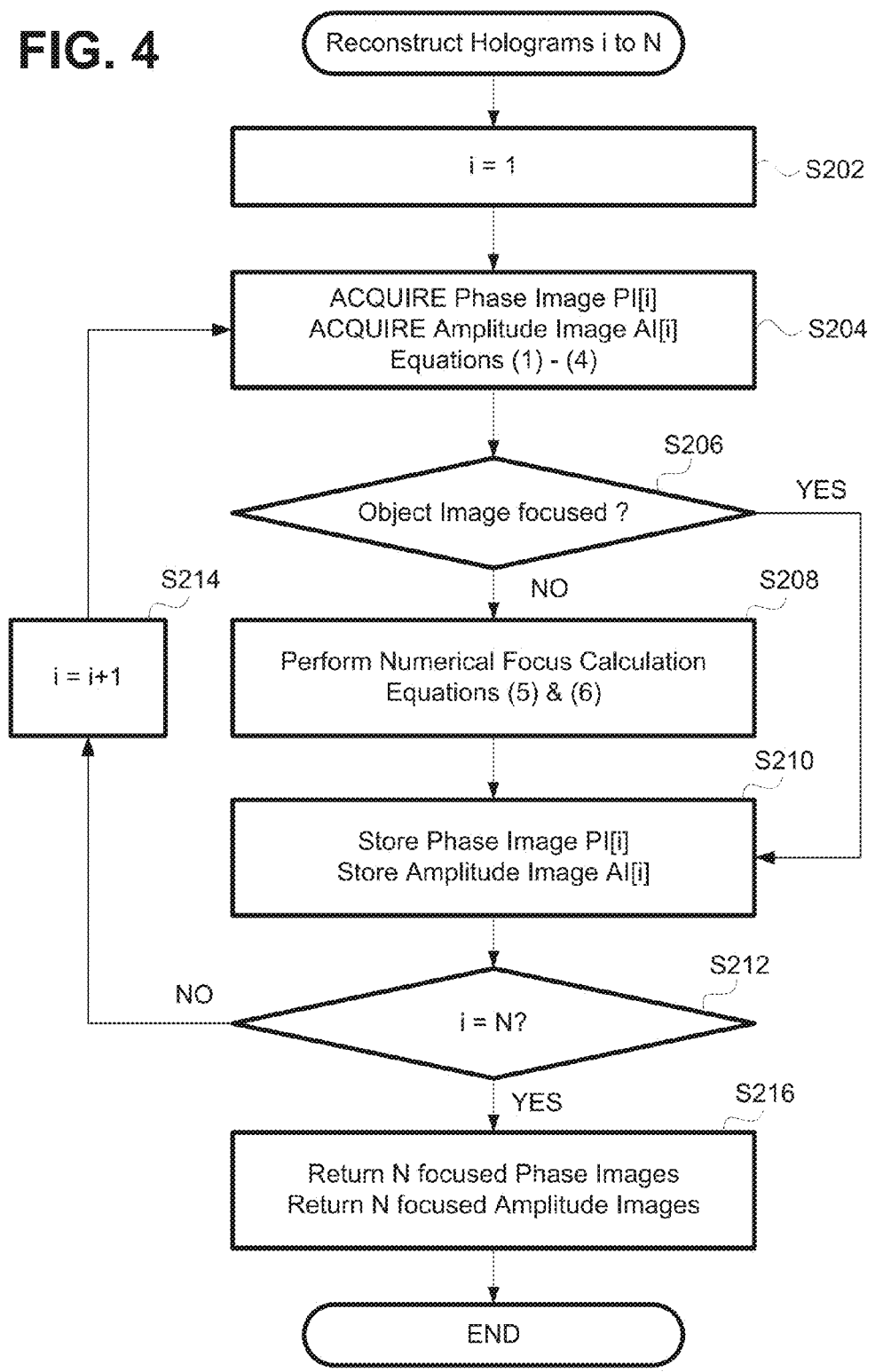
FIG. 4 illustrates en exemplary flow process for the concept of reconstructing longitudinally shifted holographic images to obtain numerically focused phase and amplitude images, in accordance with the present invention.

Turning now to FIG. 4, it is illustrated an exemplary flow process of the concept of reconstructing holograms i to N at step S120 of FIG. 3 to obtain numerically focused phase and amplitude images of the sample S. Specifically, at step S202, the index i is used to refer to the hologram H[i] stored in the computer 30. For example, the computer 30 uses the index i to refer to information stored in Table 1 and extract the parameters of a hologram H[i], and information related thereto, such as sample position and distance d. By referring to the index i, at step S204, a phase image PI[i] and an amplitude image AI[i] are obtained from the corresponding hologram Mil. The principle of wavefront reconstruction by holography is considered to be well known to persons having ordinary skill in the art to which this application pertains. Any known process applicable to holographic reconstruction, such as Fourier Transformation or the like, may be used to obtain the phase and amplitude images from each reconstructed hologram. Preferably, the process of obtaining phase and amplitude images from each hologram is performed mathematically using equations (1) to (4) described above.

Once the phase and amplitude images for the hologram H[i] have been obtained, at step S206, a determination is made as to whether the phase and amplitude images of the sample are in focus. For example, since at i=1 the initial position of the sample is already optically focused, it is possible that the phase and amplitude images reconstructed from hologram H1 may be already in focus. In such a case (YES at S206), the flow process advances to step S210. Alternatively, for example, after the sample has been longitudinally shifted from the first position z1 to the second position z2, the image of the sample at the second position z2 most likely is not in focus (NO in S206). In the case that the image of the sample is not in focus, the flow process advances to step S208.

At step S208, with the sample located at position z2, the computer 30 may numerically focus the phase and amplitude images of the sample. A numerical focus calculation may be performed by computer 30, for example, by executing program code that implements the mathematical concepts represented by equations (5) and (6). That is, the numerical focus calculation is implemented by a processor using equations (5) and (6) and the flow process of FIGS. 3 and 4, as described above.

Once the phase and amplitude images of the object have been numerically focused at step S208, or once the phase and amplitude images are determined to be already focused at step S206, the numerically focused phase and amplitude images PI[i] and AI[i] are stored in a non-illustrated memory of the computer 30. Then, at step S212, it is determined whether all of the N holograms have been reconstructed into phase and amplitude images. If all of the N holograms have not been processed (NO at S212), the index i is increased by 1 at step S214, and the flow returns to step S204. Steps S204 to S212 are iteratively repeated until all of the acquired holograms N are processed (YES at S212). Once all of the N holograms have been processed, the process advances to step S216, where N numerically focused phase images and N numerically focused amplitude images are returned to step S120 of the flow process of FIG. 3.

Next, FIGS. 5 through 8 illustrate results of an experimental demonstration of the principles of the method for reducing speckle noise in an image of an object. To experimentally demonstrate the above described principles and concepts of the present application, the inventors herein have used, as a sample, 2.5 micron beads in an immersion of oil, and a plurality of holographic images (holograms) were obtained in the manner described above in reference to FIGS. 3 and 4.

Figure 5:
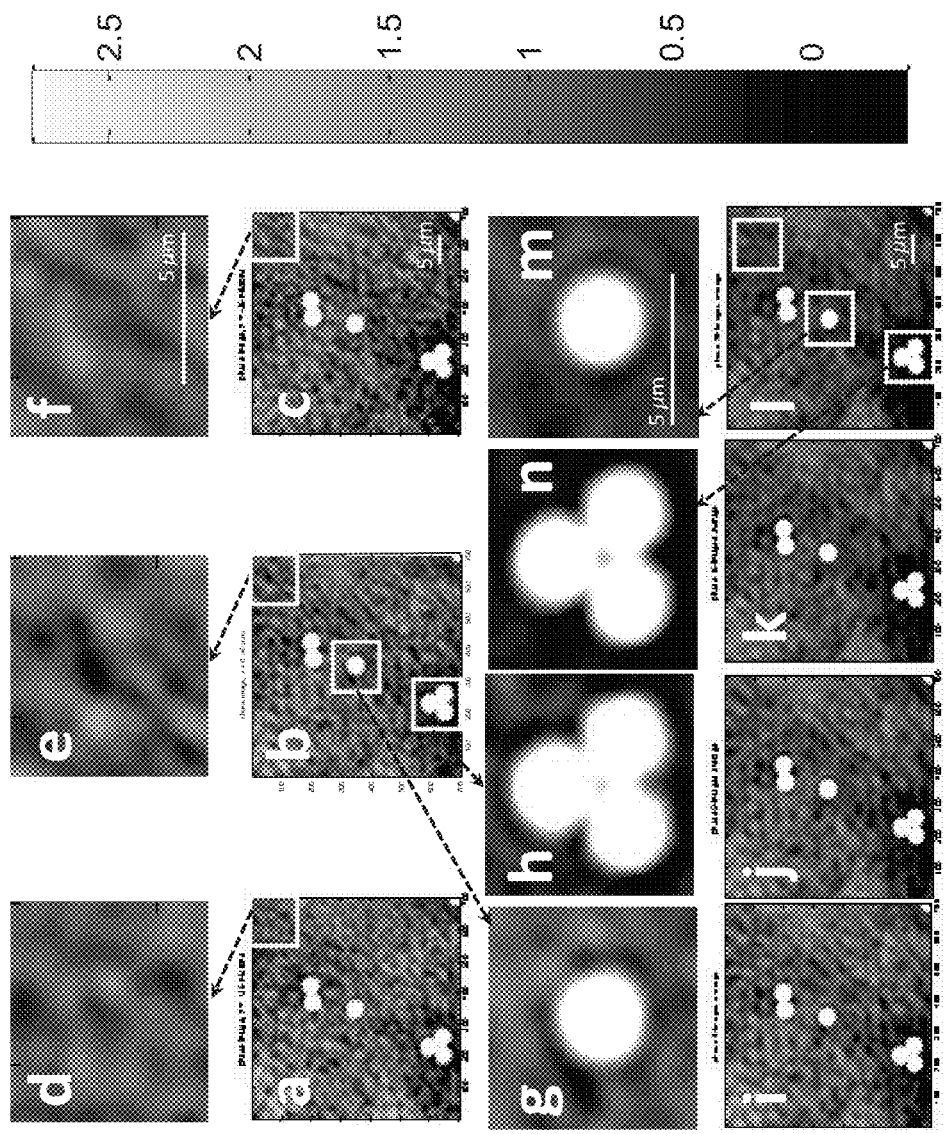
FIG. 5 shows results of an experimental demonstration of the method for reducing speckle noise in an image of an object, in accordance with the present invention.

FIG. 5 shows images in linear gray scale of an experimental demonstration of the method for reducing speckle noise in an image of an object. In the experimental demonstration that yielded the images shown in FIG. 5, the sample included 2.5 μm beads immersed in optically transparent oil. The beads were obtained from Thermo Scientific (Duke Standards, Cat No: 4025A, Polymer Microspheres in Water). The oil was obtained from Olympus (Immersion Oil for Microscopy, ITEM #: AX9603, Made in Japan). Images (a), (b) and (c) of FIG. 5 are the phase images reconstructed from holograms taken with the sample longitudinally shifted between z=+36 μm, 0 μm, and −36 μm, respectively. When the sample is optically in focus, z is defined to be equal to 0 μm. Referring back to FIGS. 2A through 2C, it should be noted that the sample may be imaged at a plurality of i to N positions. And referring back to FIGS. 3 and 4, it should be recalled that each phase image can be numerically focused even if the sample is not optically focused. Thus, in FIG. 5, the numerical focusing positions for all three cases match the position of the sample so that all three phase images are numerically focused.

Since the E-field phase is equal to the product of the refractive index contrast between the bead and the oil and the bead height, we can indirectly measure bead height image by measuring E-field phase image provided the index contrast can be known using vendors' refractive index specifications. In FIG. 5, the color bar scale indicates the height. Since the refractive index contrast is kept constant, the noise reduction in height is equivalent to the noise reduction in E-field phase. We will use height in our demonstration for this invention because we can directly compare the results with a known number which is the diameter of the bead. However, what we truly measured was the E-field phase. In FIG. 5, the entire area of image (a) represents a phase reconstruction of hologram $H(x, y, +36$ μm); the area of image (b) represents a phase reconstruction of hologram $H(x, y, 0)$; and the area of the image (c) represents a phase reconstruction of the hologram $H(x, y, -36$ μm). In image (a), the upper right corner (the area inside the box) of image (a) corresponds to an area of the sample that does not have any beads. By magnifying the area of the sample without beads, as shown in image (d), it was found that the spatial variation of the phase image is mainly due to the speckle noise. More specifically, it was found that the speckle noise pattern is z position dependent. In other words, as the z position of the sample changes, the speckle noise pattern changes randomly. The z position dependence and randomness of the speckle noise is evidenced by the speckle noise pattern differences observed between the magnified phase images (d), (e) and (f) shown in FIG. 5.

However, when the phase images are averaged, the speckle noise pattern averages out and is substantially reduced. Specifically, images (g) and (h) of FIG. 5 show magnified images of one bead and three beads in oil, respectively taken from image (b). In observing the magnified images (g) and (h), it should be noted that the backgrounds for both magnified images show random speckle noise patterns and the shapes of the bead images are not completely circular because of the speckle noise. Since the image from the beads is the same but the speckle noise is different for different z positions, averaging the images from several z positions it was seen to effectively reduce the speckle noise relative to the bead image. This remarkable effect is more clearly demonstrated in analyzing images (i), (j), (k) and (l) of FIG. 5 which are the phase reconstructed images resulting from averaging 4, 9, 16 and 25 holographic images, respectively. Each of images (i), (j), (k) and (l) in FIG. 5, is the result of respectively averaging 4, 9, 16 and 25 holographic images taken at different z positions with 3 μm as the step size for the z position. Finally, images (m) and (n) of FIG. 5 respectively show the magnified (zoomed) regions of 25 averaged images of one bead and three beads dispersed in oil. That is, images (m) and (n) of FIG. 5 are magnified images of the center box (one bead) and lower box (3 beads) illustrated in image (l) of FIG. 5. By closely comparing the magnified images (g) and (m) corresponding to one bead, and the magnified images (h) and (n) corresponding to three beads, one of ordinary skill in the art can readily appreciate that images (m) and (n), which are the averaged images, contain substantially less speckle noise and have higher definition than the non-averaged counterpart images (g) and (h), respectively.

Figure 6B:
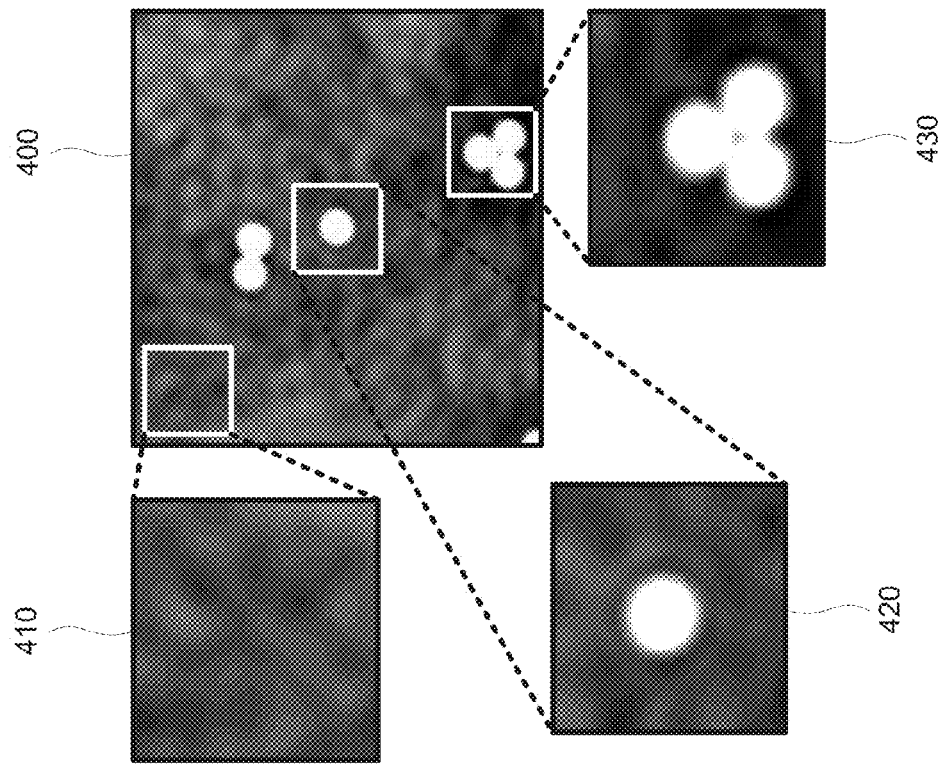
FIG. 6B illustrates a phase image and magnified regions thereof bearing reduced speckle noise obtained by averaging a plurality of holographic images.
Figure 6A:
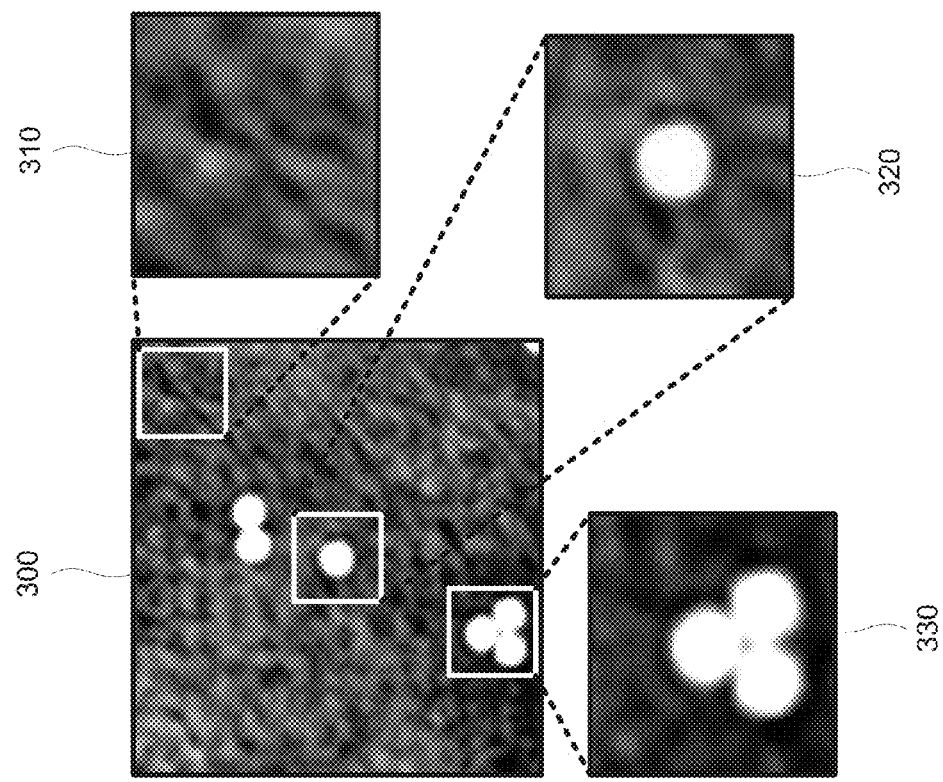
FIG. 6A illustrates a phase image and magnified regions thereof obtained from a single holographic image bearing speckle noise.

In order to even further illustrate the remarkable advantage of averaging longitudinally shifted holograms, FIG. 6A illustrates a phase image and magnified regions thereof obtained from a single holographic image bearing speckle noise; and FIG. 6B illustrates a phase image and magnified regions thereof bearing reduced speckle noise obtained by averaging a plurality of holographic images. More specifically, FIG. 6A illustrates an image 300 corresponding to image (b) of FIG. 5. In addition, in FIG. 6A, images 310, 320 and 330 correspond respectively to images (e), (g) and (h) of FIG. 5. As illustrated in FIG. 6A, image 310 is a zoomed image of upper right hand corner box (no bead) of image 300; image 320 is a zoomed image of the center box (one bead) of image 300; and image 320 is a zoomed image of the bottom box (three beads) of image 300. FIG. 6A corresponds to a phase image reconstructed from a single hologram taken with the sample located at z=0 μm.

FIG. 6B illustrates an image 400 corresponding to image (l) of FIG. 5. In addition, in FIG. 6B, images 420 and 430 correspond respectively to images (m) and (n) of FIG. 5. As illustrated in FIG. 6B, image 410 is a zoomed image of the upper left hand corner box (no bead) of image 400; image 420 is a zoomed image of the center box (one bead) of image 400; and image 430 is a zoomed image of the bottom box (three beads) of image 400. FIG. 6B corresponds to an image resulting from averaging 25 phase images with the sample longitudinally shifted in 3 micron steps along the beam path of the object beam.

In comparing FIG. 6A to FIG. 6B, it can be clearly appreciated that the speckle noise present in the image 300 obtained when the sample is located at z=0 μm (i.e., when the sample is optically focused) is much greater than the speckle noise present in image 400 obtained by averaging plural images when the sample is longitudinally shifted. In other words, FIGS. 6A and 6B clearly demonstrate that an object image obtained by averaging E-field images which are reconstructed from measured holographic images is superior both in terms of bead image shape (definition) and reduced background noise. Both improvements are attributed to the fact that the speckle noise is reduced by applying the above discussed longitudinal shift to the sample.

Figure 7:
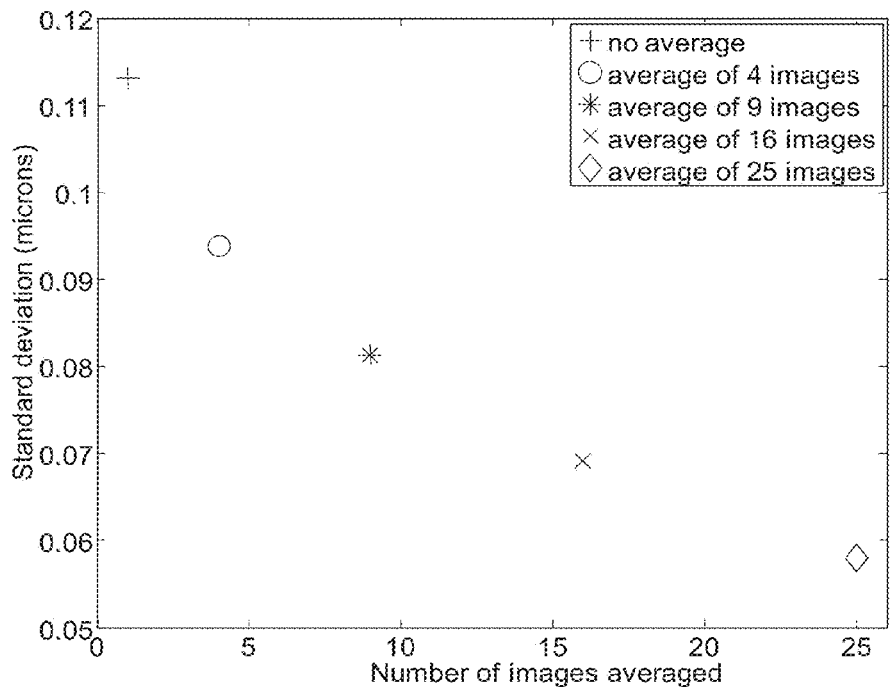
FIG. 7 is a plot of the height standard deviation of speckle noise in a region without beads of a phase image, as a function of number of images averaged, in accordance with the present invention.

FIG. 7 is a plot of the height standard deviation of speckle noise in a region without beads of a phase image, as a function of number of images averaged, in accordance with the present invention. Specifically, FIG. 7 is a plot of the height standard deviation of image 310 (the area inside the upper right corner box) of FIG. 6A and image 410 (the area inside the upper left corner box) of FIG. 6B, as a function of number of images averaged. In addition to the above discussed results, from FIG. 7, it can be observed that as the number of averaged images increases, the height standard deviation of speckle noise in a region without beads of a phase image decreases. Specifically, in FIG. 7, it is shown that the height standard deviation of speckle noise in a region without beads of a non-averaged phase image can be larger than 0.11 μm. However, the height standard deviation of speckle noise in a region without beads of a phase image obtained by averaging 25 images can be as low as 0.08 μm. These results appear to demonstrate that the speckle noise may be exponentially reduced as the number of averaged images is linearly increased.

Figure 8:
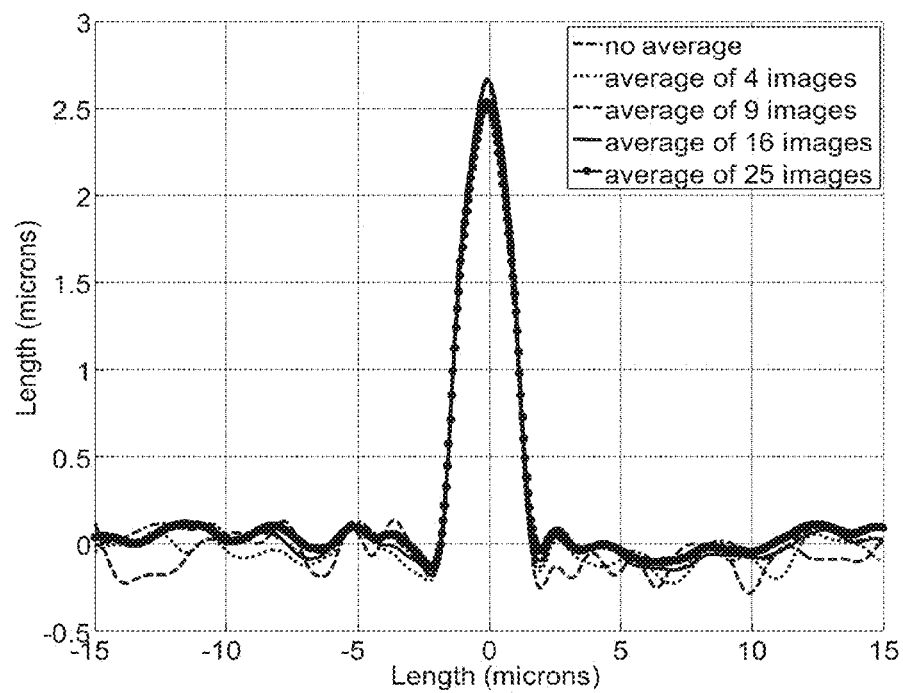
FIG. 8 is a graph showing the intensity profile across the center of the single bead image as a function of number of images averaged to reduce speckle noise.

FIG. 8 is a graph showing the intensity profile across the center of the single bead image as a function of number of images averaged to reduce speckle noise. Specifically, FIG. 8 shows the height profile across the center of the single bead, for example, at the center of image 320 in FIG. 6A or image 420 in FIG. 6B, as a function of the number of images averaged. Similar to FIG. 7, in FIG. 8 it can be observed that as the number of averaged images increases, the speckle noise is reduced, and more importantly, the center intensity of the one bead image becomes better defined. Accordingly, both results illustrated in FIGS. 7 and 8 quantitatively demonstrate that the spatial variation due to speckle noise can be reduced by averaging the longitudinally shifted E-field images which are reconstructed from measured holographic images.

In the above description, an off-axis configuration of a holographic imaging technique has been described. In addition, using the off-axis holography embodiment (shown in FIG. 1) where the angle between reference beam and object beam is not zero, it has been experimentally demonstrated that by averaging a plurality of images obtained by longitudinally shifting the sample the speckle noise can be effectively reduced and the resolution of an image can be greatly enhanced. However, the present invention is not limited to the off-axis configuration alone. Indeed, the applicability of the present invention can be easily extended to phase-shifting holography where the reference beam and object beam are parallel and in-line. Specifically, since speckle noise is position dependent, even when the object beam and reference beam are in-line and parallel to each other, longitudinally shifting the sample can still generate holograms with uncorrelated speckle noise. That is, due to the change of sample longitudinal position, the speckle noises of the phase and amplitude images from different holograms are uncorrelated. Thus, the retrieved and numerically focused phase and amplitude images, as described above, still have same spatial distribution, but different speckle noise patterns. Consequently, by averaging the processed phase and amplitude images, the speckle noise is reduced and the quality of the phase and amplitude images of the sample is improved even when an in-line configuration is used. Specifically, in practice, the longitudinal shifting should be the same for both cases as long as the E fields are reconstructed using either phase-shifting holography or off-axis holography.

In addition, although FIG. 1 illustrates an embodiment in which the object beam is transmitted (travels) through the sample, and an experimental demonstration has been performed using this specific arrangement, it is envisioned that one of ordinary skill in the art may easily adapt the above described concepts in an embodiment in which the object beam is reflected from the sample.

Figure 9:
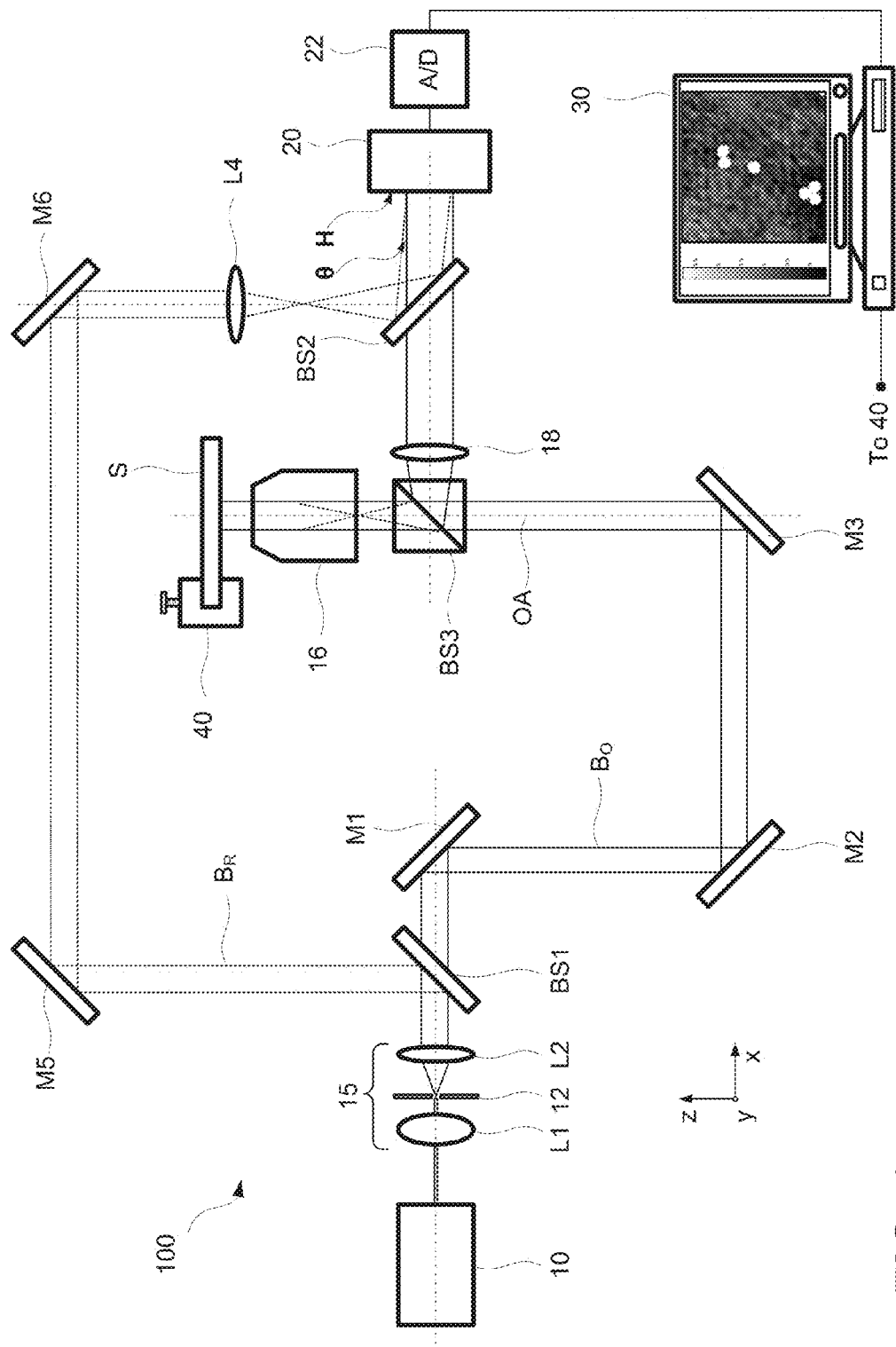
FIG. 9 is a diagram that illustrates an arrangement of an optical apparatus for obtaining holographic images of a sample, and for performing speckle noise reduction on the image of the sample, according to a second embodiment of the present invention.

FIG. 9 illustrates an arrangement of an optical apparatus for obtaining holographic images of a sample, and for performing speckle noise reduction on the image of the sample, according to a second embodiment of the present invention. The apparatus 100 of the second embodiment illustrated in FIG. 9 is substantially similar to the apparatus 100 described in the first embodiment of FIG. 1. Accordingly, in the second embodiment, unnecessary description will be obviated to avoid repetition, and only relevant differences are described herein. Specifically, in the second embodiment, the object beam $B_O$ is not transmitted through the sample S; instead, the object beam $B_O$ is reflected from a surface of the sample S. The mode of operation, holographic recording and reconstruction of holograms in both embodiments does not change. Specifically, similar to the first embodiment, in the second embodiment the sample S is moved along an optical axis (OA) of the object beam $B_O$, and a plurality N of holographic images (holograms) are recorded at corresponding N different z positions. One notable difference in the second embodiment, as compared to the first embodiment, is that mirror M4 of FIG. 1 has been removed, and a beam splitter BS3 is used instead to guide light reflected from a surface of sample S towards the detector 20.

Advantageously, in the reflection mode, the E-field phase image corresponds to the surface morphology, surface contour, surface roughness, or topography of the sample S. The noise in E-filed phase will translate to the surface roughness measurement noise. Therefore, providing multiple E-field phase images with uncorrelated speckle noises for averaging will advantageously enable measurement of morphological features in the surface of a sample. In this manner, for example, when a surface of a thin waveplate sample or a semiconductor substrate is coated with certain patterns, features indicative of such patterns can be measured with high accuracy. It is a matter of course therefore that the transmission configuration of the first embodiment (FIG. 1) or the reflection configuration of the second embodiment (FIG. 9) can give the same advantageous benefits in terms of reducing speckle noise.

Those skilled in the art will appreciate that many variations are possible within the scope of the examples described herein. Thus, while the features of the invention have been described with reference to particular embodiments, it will be understood that structural and functional modifications may be made without departing from the scope of the following claims.

The invention claimed is:

1. A method for reducing speckle noise in an image of an object, comprising:
    generating a object beam and a reference beam with a coherent radiation source;
    placing the object at a first position along a beam path of the object beam and exposing the object to the object beam at the first position,
    recording a first holographic image formed by interference between the object beam being modulated by the object located at the first position and the reference beam not modulated by the object;
    moving the object in a longitudinal direction along the beam path of the object beam from the first position to a second position different than the first position and exposing the object with the object beam at the second position;
    recording a second holographic image formed by interference between the object beam modulated by the object located at the second position and the reference beam not modulated by the object;
    reconstructing a first E-field image from the first holographic image recorded at the first position, and reconstructing a second E-field image from the second holographic image recorded at the second position, and
    generating an object image by averaging the first E-field image and the second E-field image,
    wherein the step of generating the object image includes performing a numerical focus calculation of at least one of the first E-field image or the second E-field image.

2. The method according to claim 1, wherein the beam path of the object beam extends in a direction parallel to the object beam, and wherein the object beam is transmitted through the object.

3. The method according to claim 1, wherein the beam path of the object beam extends in a direction parallel to the object beam, and wherein the object beam is reflected from of surface of the object.

4. The method according to claim 1, further comprising:
    setting the object at an optically focused position prior to recording the first holographic image,
    wherein the optically focused position is the first position.

5. The method according to claim 1, wherein the object beam interferes with the reference beam in an off-axis manner.

6. The method according to claim 1, wherein the object beam interferes with the reference beam in an in-line manner.

7. The method according to claim 1, wherein the object beam and the reference beam include coherent light emitted by a coherent light source at a predetermined wavelength.

8. The method according to claim 1, wherein averaging the first E-field image and the second E-field image includes obtaining either an arithmetic mean or a weighted average the first E-field image and the second E-field image.

9. An apparatus configured to record an image of an object and to reduce speckle noise in the image of the object, the apparatus comprising:
    a radiation source configured to generate a radiation beam;
    an interferometer configured to divide the radiation beam into an object beam and a reference beam;
    a movable holder configured to move the object to a plurality of longitudinal positions along a beam path of the object beam by longitudinally shifting a position of the object along the beam path of the object beam; a radiation detector configured to detect a plurality of holograms formed by interference between the object beam modulated by the object and the reference beam not modulated by the object, each hologram being formed at a corresponding one of the plurality of longitudinal positions;
    a computer having a processor and configured to store the plurality of holograms in correspondence to the plurality of longitudinal positions at which the holograms have been detected,
    wherein the processor is configured to reconstruct a plurality of E-field images from the plurality of stored holograms, and to generate an output image by averaging the plurality of reconstructed E-field images, and
    wherein, in order to generate the output image by averaging the plurality of reconstructed E-field images, the processor is further configured to perform a numerical focus calculation on at least one of the plurality of reconstructed E-field images.

10. The apparatus according to claim 9, wherein the processor is further configured to determine whether at least one of the reconstructed E-field images is optically focused, and
    wherein, in a case where at least one of the reconstructed E-field images is not optically focused, the processor performs a numerical focus calculation so that each of the of the plurality of reconstructed E-field images is either numerically focused or optically focused.

11. The apparatus according to claim 9, wherein at least part of the object beam path corresponds to an optical system of a digital holographic microscope.

12. The apparatus according to claim 9, wherein averaging the plurality of reconstructed E-field images includes obtaining either an arithmetic mean or a weighted average of the plurality of reconstructed E-field images,
    wherein one of the plurality of reconstructed E-field images obtained from a hologram recorded at a predetermined position is given a highest weight.

* * * * *